(12) United States Patent
Di et al.

(10) Patent No.: US 12,209,038 B2
(45) Date of Patent: Jan. 28, 2025

(54) EFFLUENT

(71) Applicant: LINCOLN UNIVERSITY, Lincoln (NZ)

(72) Inventors: Hong Jie Di, Lincoln (NZ); Keith Craig Cameron, Lincoln (NZ)

(73) Assignee: LINCOLN UNIVERSITY, Lincoln (NZ)

(\*) Notice: Subject to any disclaimer, the term of this patent is extended or adjusted under 35 U.S.C. 154(b) by 0 days.

(21) Appl. No.: 17/596,672

(22) PCT Filed: Oct. 12, 2020

(86) PCT No.: PCT/NZ2020/050123
§ 371 (c)(1),
(2) Date: Dec. 16, 2021

(87) PCT Pub. No.: WO2021/071367
PCT Pub. Date: Apr. 15, 2021

(65) Prior Publication Data
US 2023/0183109 A1     Jun. 15, 2023

(30) Foreign Application Priority Data
Oct. 10, 2019   (NZ) .......................... 757817

(51) Int. Cl.
*C02F 1/52*    (2023.01)
*C02F 101/32*  (2006.01)
*C02F 103/00*  (2006.01)
*C02F 103/20*  (2006.01)

(52) U.S. Cl.
CPC ...... *C02F 1/5245* (2013.01); *C02F 2101/322* (2013.01); *C02F 2103/007* (2013.01); *C02F 2103/20* (2013.01); *C02F 2209/11* (2013.01)

(58) Field of Classification Search
None
See application file for complete search history.

(56) References Cited

U.S. PATENT DOCUMENTS

| 2006/0005784 | A1  | 1/2006 | Ind |
| 2011/0044927 | A1* | 2/2011 | Weschler ................. A61L 9/01 |
|              |     |        | 424/76.6 |
| 2016/0076057 | A1  | 3/2016 | Scalzi et al. |

FOREIGN PATENT DOCUMENTS

| CN | 107055723   | A  |   | 8/2017  |           |
| DE | 2638957     | A1 |   | 3/1978  |           |
| KR | 20010053264 | A  | * | 6/2001  | ............... C02F 9/00 |
| KR | 20050026294 | A  |   | 3/2005  |           |
| NZ | 743564      | A  |   | 7/2019  |           |

OTHER PUBLICATIONS

Public specification for NZ 721286 parent of NZ 743564 in IDS); Nov. 2017.*
Machine translation for KR 20010053264; Jun. 2001.*
International Search Report and Written Opinion received for PCT/NZ2020/050123, mailed Jan. 25, 2021.
(Continued)

*Primary Examiner* — Peter Keyworth
(74) *Attorney, Agent, or Firm* — Greer, Burns & Crain, Ltd

(57) ABSTRACT

The use of ferric sulphate or polyferric sulphate to treat liquid animal effluent to reduce methane emissions therefrom.

1 Claim, 10 Drawing Sheets

(56) References Cited

OTHER PUBLICATIONS

International Preliminary Report on Patentability received for PCT/NZ2020/050123, mailed Apr. 30, 2021.
Fernández, Ú.A., "Effect of laboratory iron dosing on metal and phosphorus behaviour in anaerobic digesters," Thesis for Master of PHilosophy, The University of Birmingham, Oct. 2010, 121 pages.

\* cited by examiner

EFFLUENT

BACKGROUND

Technical Field

The present invention relates to improvements in and relating to effluent. In particular, improvements in, and relating to, methane reduction in relation to animal effluent.

The present invention will now primarily for ease of reference be described in relation to a dairy farm effluent treatment system. However, it is envisaged the present invention may well have application to other sources of animal effluent so any such discussion should not necessarily be seen as limiting.

Animal effluent storage on dairy farms presents a number of critical problems which include emissions of methane gas ($CH_4$), which is a powerful greenhouse gas with a 100-year global warming potential 28 times that of carbon dioxide.

There has been an increase in proportion of New Zealand dairy farms using animal effluent storage ponds for manure management; from c. 5% in 1990 to c. 81% in 2017 (MPI 2017). This increase in the use of storage ponds has occurred in order to:

(i) capture and store effluent from off-paddock structures (e.g. milking shed, feed pads, stand-off pads); and
(ii) enable irrigation of the effluent onto land to be deferred until the risk of ponding and/or runoff into rivers and lakes is avoided (commonly called 'deferred irrigation').

Regional authorities (regional councils) have been encouraging/requiring dairy farmers to construct effluent ponds that provide a large storage capacity (in some cases up to 3 months of storage) in order to reduce the risk of effluent having to be applied onto land during wet conditions.

However, an 'unintended consequence' of increasing the number and size of animal effluent storage ponds is that there is a greater risk of methane emissions contributing to climate change.

Data published in New Zealand's Greenhouse Gas Inventory states that greenhouse gas emissions from Manure Management increased by 121% from 720.7 kt $CO_2$-e in 1990 to 1,596.8 kt $CO_2$-e in 2017 (MFE, 2019a).

The vast majority (>92%) of the greenhouse gas emissions from the Manure Management category are in the form of methane gas produced during storage and management of farm dairy effluent. When effluent is stored in ponds, the organic matter in the effluent decomposes anaerobically producing methane gas. In 2017, methane emissions from the manure management contributed 1,475.1 kt $CO_2$-e; which represents 92.4% of the Manure Management category (MFE, 2019a). The remainder 121.6 kt $CO_2$-e (7.2%) is nitrous oxide produced by nitrification and denitrification processes (i.e. <8% of the manure management category).

In 2017, Manure Management contributed 4.1% of greenhouse gas emissions from the total New Zealand agricultural sector making it the third largest GHG category after Enteric Fermentation and Agricultural Soils categories. However, since the vast majority of effluent storage ponds are constructed on dairy farms it has been estimated that Manure Management accounts for about 10% of the methane emissions from dairy farms (MPI, 2012; Laubach et al., 2015).

The New Zealand Ministry for the Environment Interactive GHG Inventory (MFE, 2019a) states that in 2017 the amount of methane emitted from dairy cattle manure ponds was equivalent to 1,255 kt $CO_2$-e and that dairy cattle enteric fermentation emissions of methane was equivalent to 13,560 kt $CO_2$-e. Thus, the total amount of methane emitted from New Zealand dairy farms was equivalent to 14,815 kt $CO_2$-e and 8.5% of this total amount came from manure management (i.e. ponds).

Therefore, it would be useful if an animal effluent treatment system could be devised which could reduce the risk of methane emissions from animal effluent and especially from animal effluent storage ponds or the like.

A recently published expert review of mitigation options to reduce methane emissions from New Zealand farm dairy effluent ponds does not mention the use of a treatment solution such as polyferric sulphate or ferric sulphate to reduce methane emissions (MPI, 2014). In fact, this review teaches away from using a treatment solution, such as polyferric sulphate or ferric sulphate, because it only lists the following options to reduce methane emissions: (i) covering the effluent pond and flaring of $CH_4$, with or without energy recovery; (ii) bio-filter cover, comprising $CH_4$ consuming bacteria, on the pond surface; (iii) effluent acidification; (iv) conversion of anaerobic to aerobic or facultative ponds; (v) solids separation to physically prevent solids from entering anaerobic ponds and depositing them in aerobic conditions on pastures instead; and (vi) reduce the time of effluent storage in anaerobic ponds (MPI, 2014). Similarly, the New Zealand Prime Minister's Chief Scientific Advisor (CSA) has recently advised the Prime Minister that methane emissions can only be mitigated by the following strategies employed during storage, namely:

(i) covering effluent storage ponds for energy recovery;
(ii) keeping effluent aerobic by mechanical mixing;
(iii) carrying out solids separation to prevent solids from entering anaerobic ponds;
(iv) using a biofilter cover on the pond surface (Gluckman, 2018).

The report does not mention using polyferric sulphate or ferric sulphate, to reduce methane emissions (Gluckman, 2018).

These mitigation options cited above have not been widely adopted throughout New Zealand dairy farms to mitigate methane emissions, either they are not practical, not economical, or not effective. Significantly, no other methane mitigation options are proffered by the Chief Scientific Advisor.

It is an object of the present invention to address the foregoing problems of methane gas emissions or at least to provide the public with a useful choice.

All references, including any patents or patent applications cited in this specification are hereby incorporated by reference. No admission is made that any reference constitutes prior art.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

Definitions

The terms 'farm dairy effluent (FDE)' and 'liquid farm effluent' and 'liquid animal effluent' and 'effluent' and 'dirty water' and 'slurry' all refer to animal urine and fecal matter which has been rinsed from a yard or other animal containment area and contains liquid (i.e. water) as well as solid matter mixed therein.

The term 'treated effluent' as used herein refers to the effluent derived from the treatment of the liquid animal effluent.

SUMMARY

According to a first aspect of the present invention there is provided the use of ferric sulphate (FS) or polyferric sulphate (PFS) to treat liquid animal effluent to reduce methane emissions therefrom.

According to a second aspect of the present invention there is provided the use of ferric sulphate or polyferric sulphate to treat liquid animal effluent collected and/or stored in:
   ponds;
   lagoons;
   tanks; or
   storage or transportation vessels
to reduce methane emissions therefrom.

According to a third aspect of the present invention there is provided the use of ferric sulphate or polyferric sulphate to treat liquid animal effluent collected from a source of liquid effluent to reduce methane emissions.

According to a fourth aspect of the present invention there is provided the use of ferric sulphate or polyferric sulphate to reduce methane emissions from liquid animal effluent via a dose calculated from the measurement of the turbidity (NTU) of the effluent to be treated.

According to a fifth aspect of the present invention there is provided the use of a selected dose of FS or PFS (mg Fe/L effluent) to achieve a desired percentage reduction in the amount of methane emitted, wherein the dose required for a desired percentage reduction is determined by the formulae detailed in Table 1.

Preferably, to achieve a >95% reduction the dosage of FS or PFS in mg/Fe/L of effluent is:

Dosage=0.1×NTU value of effluent.

Preferably, to achieve a 90%-95% reduction the dosage of FS or PFS in mg/Fe/L of effluent is:

Dosage=0.08×NTU value of effluent.

Preferably, to achieve a 80%-89% reduction the dosage of FS or PFS in mg/Fe/L of effluent is:

Dosage=0.06×NTU value of effluent.

Preferably, to achieve a 60%-79% reduction the dosage of FS or PFS in mg/Fe/L of effluent is:

Dosage=0.04×NTU value of effluent.

Preferably, to achieve a 40%-59% reduction the dosage of FS or PFS in mg/Fe/L of effluent is:

Dosage=0.024×NTU value of effluent.

Preferably, to achieve a 20%-39% reduction the dosage of FS or PFS in mg/Fe/L of effluent is:

Dosage=0.013×NTU value of effluent.

According to a sixth aspect of the present invention there is provided the use of ferric sulphate and polyferric sulphate substantially as described above wherein the ferric sulphate and polyferric sulphate can also treat the liquid animal effluent to reduce hydrogen sulphide emissions therefrom.

According to a seventh aspect of the present invention there is provided a method to reduce methane emissions from animal effluent by adding ferric sulphate or polyferric sulphate including the steps of:
   a) capturing liquid effluent from an animal containment area in a treatment tank;
   b) measuring the turbidity of the effluent to determine the right dosage of PFS or FS to achieve a desired reduction in the amount of methane emitted;
   d) treating the captured effluent directly with ferric sulphate or polyferric sulphate;
   e) directing the treated effluent to one or more on-farm effluent storage pond(s)/tank(s).

According to an eighth aspect of the present invention there is provided a method to reduce methane emissions from liquid animal effluent by adding ferric sulphate or polyferric sulphate directly into an effluent storage pond/tank.

According to a ninth aspect of the present invention there is farm effluent treatment system to reduce methane emissions from liquid animal effluent by the addition of ferric sulphate or polyferric sulphate into a sump tank; wherein the system includes:
   a mixer in the sump tank to mix the ferric sulphate or polyferric sulphate with the effluent;
   a pump to transfer the treated effluent into a storage pond(s)/tank(s);
wherein the ferric sulphate or polyferric sulphate in use is added into the sump tank when a prescribed amount of effluent has been pumped out of the sump tank into the storage pond(s)/tank(s), so that the ferric sulphate or polyferric sulphate can react with an equivalent amount of fresh effluent that drains into, or is pumped into, the sump tank.

Preferably, the prescribed amount of effluent to be pumped out may be substantially the full volume of the sump tank or some other known volume that will be replaced to fill the sump tank prior to treating. For example, in some preferred embodiments the prescribed amount may be substantially 5000 L which is an adjustable proportion of the volume of the sump tank.

According to a 10th aspect of the present invention there is provided the use of the measured solids content of liquid animal effluent to determine the dosage of polyferric sulphate or ferric sulphate required to treat the liquid animal effluent to achieve the desired reduction in methane emissions.

BRIEF DESCRIPTION OF THE DRAWINGS

Further aspects of the present invention will become apparent from the ensuing description which is given by way of example only and with reference to the accompanying drawings.

In the drawings, the units for methane gas emissions are presented in carbon dioxide equivalents because these are the standard units used in New Zealand's national inventory of greenhouse gas emissions (MFE, 2019b) and these units account for the fact that methane has a global warming potential that is 28 times that of carbon dioxide.

Therefore the 'methane emission flux' (i.e. the mass of methane emitted per unit area per unit time) is expressed in units of 'mg $CO_2$-e/$m^2$/h'; and the 'total amount of methane emitted' over the measurement period is expressed in units of 'kg $CO_2$-e/ha'.

The maximum rate of PFS or FS used in each experiment was the rate calculated to achieve a 90% or greater reduction in the amount of methane emitted (as explained below). The rate of PFS required to achieve this reduction depends on the content of solid material (including organic matter) in the FDE (turbidity being used as a measurement/indicator thereof). Therefore the maximum rate of PFS or FS used in each experiment varies depending on the turbidity/solids content of the effluent. Lower rates of PFS were also used in some experiments to examine the effectiveness of lower rates of PFS to reduce methane emissions.

Figure 1:
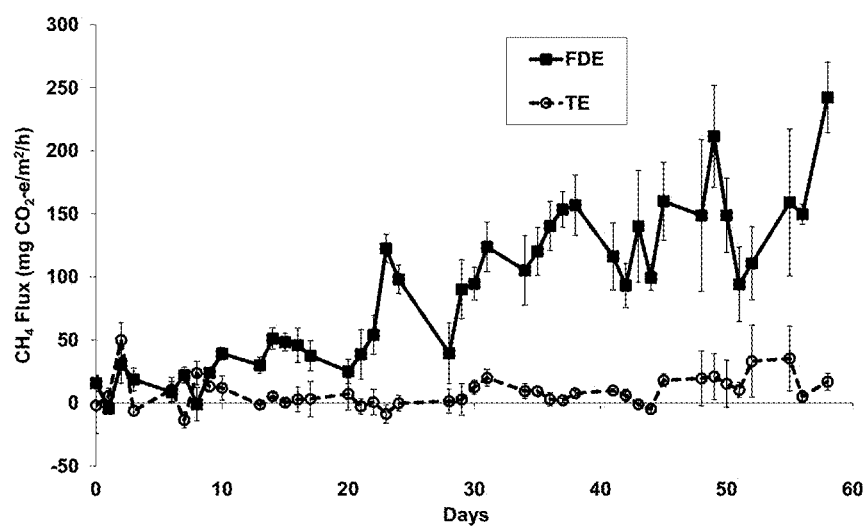
Figure 2:
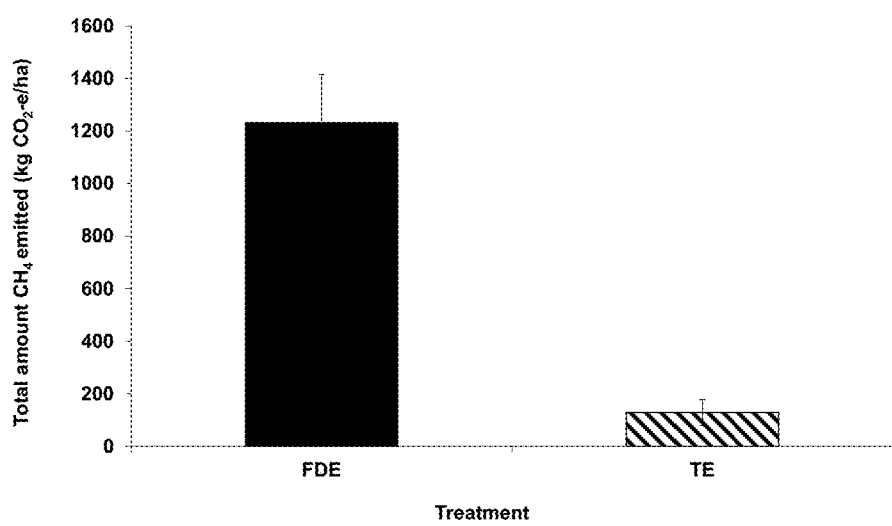
Figure 3:
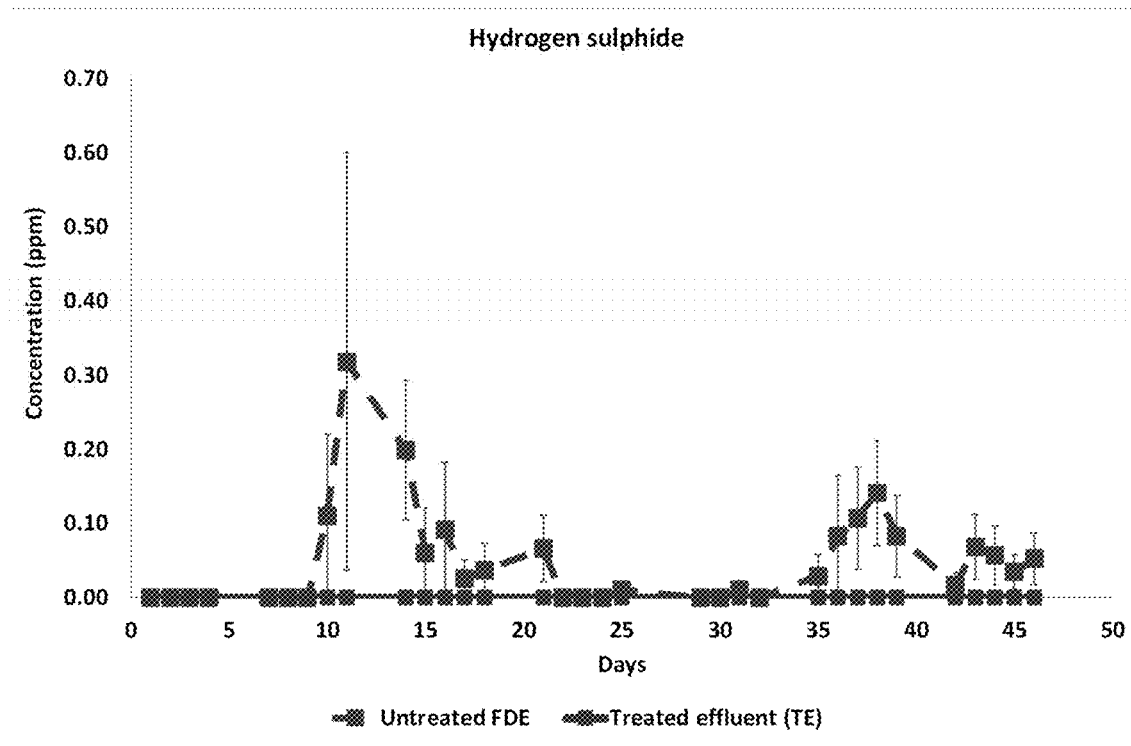

FIG. 1 shows how polyferric sulphate treatment solution applied at an average rate of 200 mg Fe/L of farm dairy effluent can reduce the methane emission flux from treated effluent (TE) compared to untreated farm dairy effluent (FDE);

FIG. 2 shows how polyferric sulphate treatment solution applied at an average rate of 200 mg Fe/L of farm dairy effluent can reduce the total amount of methane emitted over the 58-day period from treated effluent (TE) compared to untreated farm dairy effluent (FDE);

FIG. 3 shows that polyferric sulphate applied at an average rate of 200 mg Fe/L of farm dairy effluent can reduce methane emissions (as shown in FIGS. 1 and 2) without increasing hydrogen sulphide ($H_2S$) emissions (in fact PFS significantly reduced the $H_2S$ emissions).

Figure 4A:
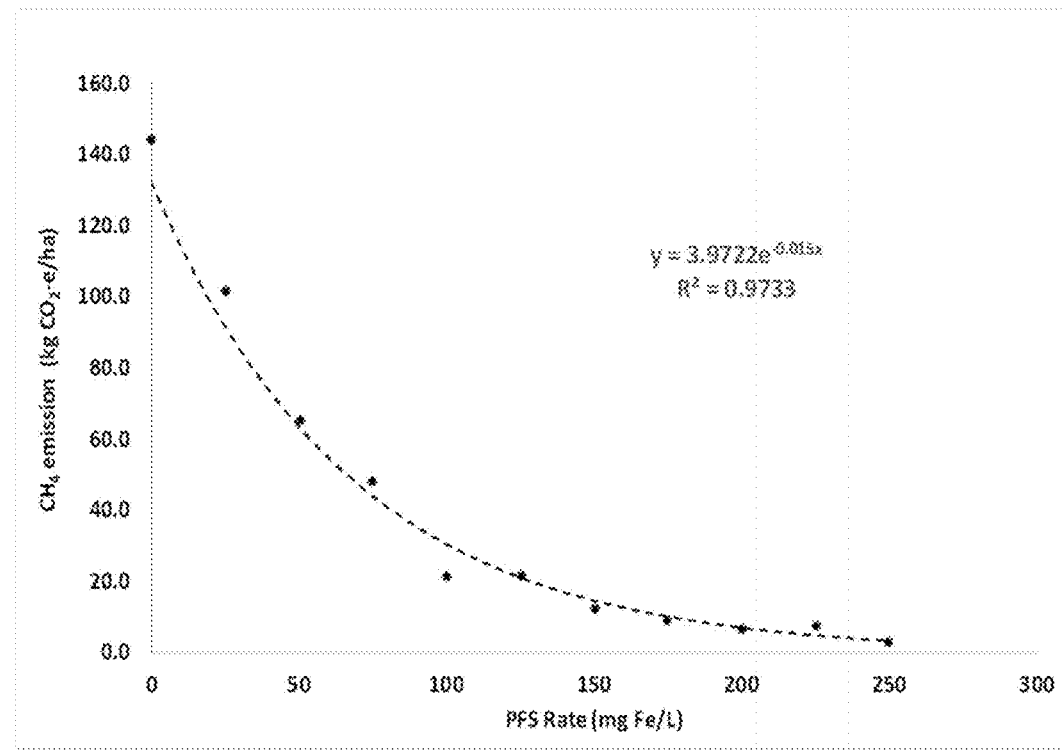

FIG. 4a shows that, in general, the total amount of methane emitted from farm dairy effluent (FDE) is inversely related to the rate of polyferric sulphate (PFS) used in the treatment. The statistically determined $R^2$ value (i.e. 'the coefficient of determination') shown in the drawing is 0.9733; which is very close to the maximum value of 1.0 proving that there is a very strong relationship between the amount of methane emitted and the rate of polyferric sulphate applied in this experiment. The statistically fitted line shows that, in general, the higher the rate of PFS application then the lower the amount of methane emitted.

Figure 4B:
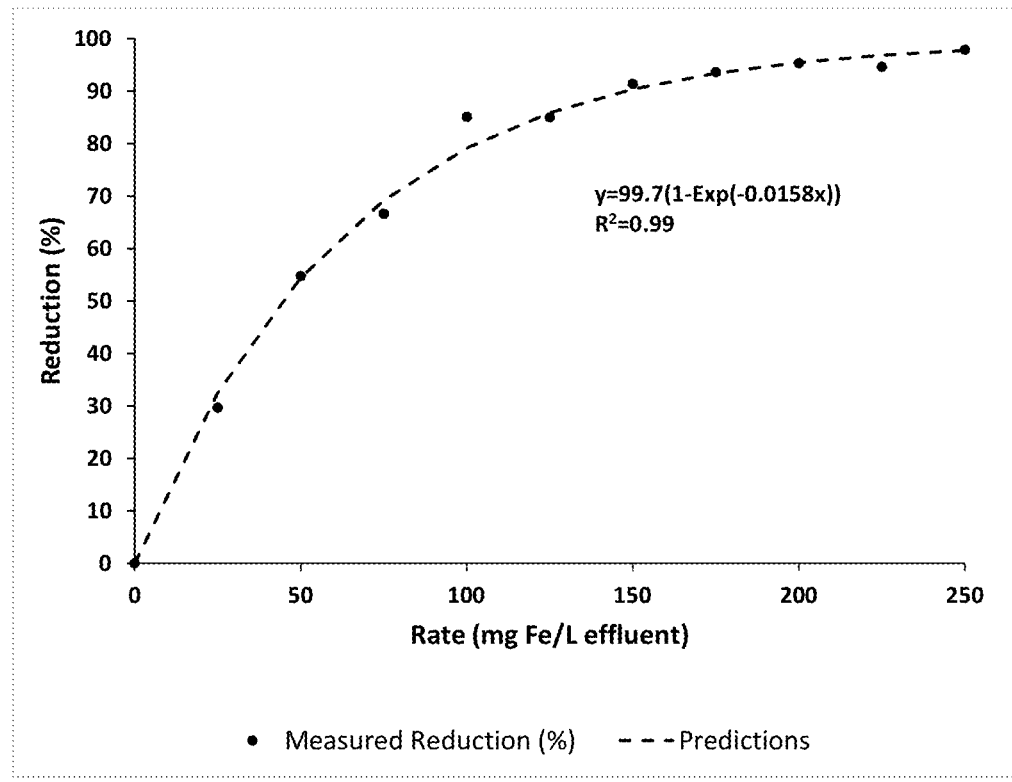

FIG. 4b shows the relationship between the rate of polyferric sulphate used and the percentage (%) reduction in the amount of methane emitted at that rate compared with the methane emissions in the untreated effluent. This relationship can be used to calculate the rate of PFS (or FS) that is required to achieve a desired percentage reduction in the amount of methane emitted.

Figure 5:
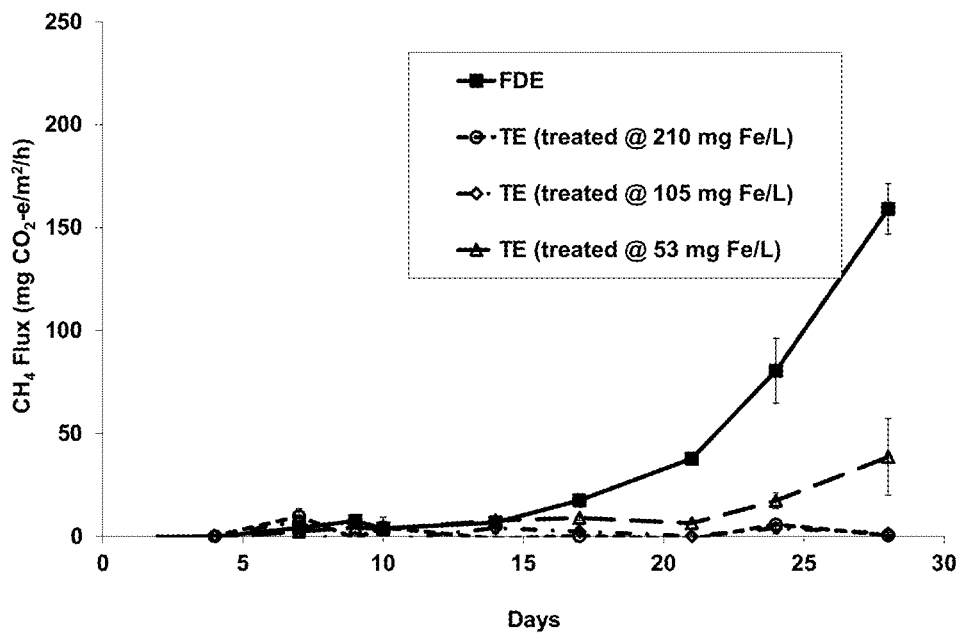

FIG. 5 shows that the methane emission flux from untreated farm dairy effluent (FDE) is reduced when polyferric sulphate is applied to treat the effluent at three different rates: (i) 210 mg Fe/L of FDE (i.e. the rate required to reduce the amount of methane emitted by >90% from this effluent)), (ii) 105 mg Fe/L of FDE (i.e. 50% of the initial rate), and (iii) 53 mg Fe/L of FDE (i.e. 25% of the initial rate). Error bars are ±standard errors of the mean.

Figure 6:
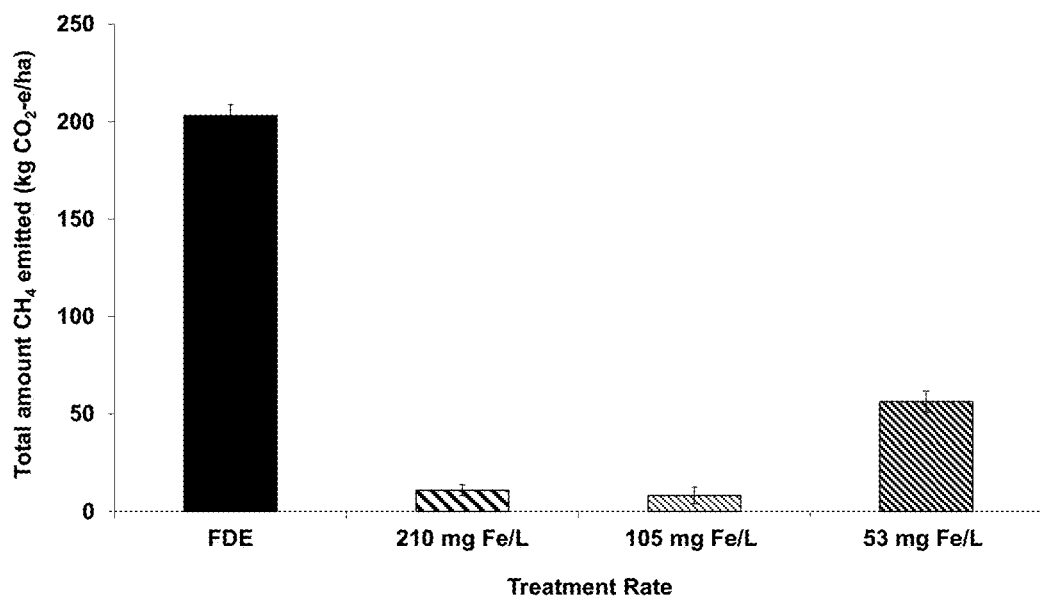

FIG. 6 shows that the total amount of methane emitted from untreated FDE is reduced when the effluent is treated with PFS at all three rates: (i) 210 mg Fe/L of FDE (ii) 105 mg Fe/L of FDE, and (iii) 53 mg Fe/L of FDE. Error bars are ±standard errors of the mean.

Figure 7:
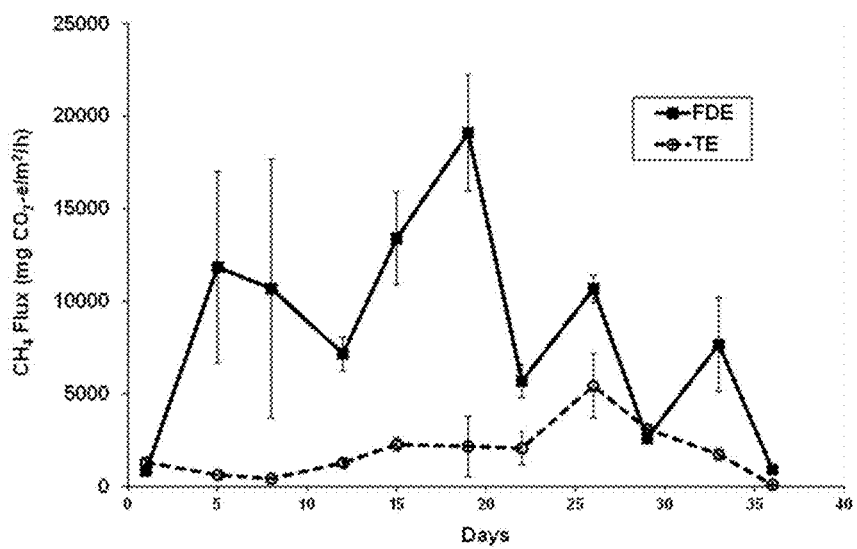

FIG. 7 shows that a single PFS treatment at a rate of 200 mg Fe/L of farm dairy effluent (FDE) on day 1 can reduce the methane emission flux from the treated effluent (TE) for 36 days. Error bars are ±standard errors of the mean.

Figure 8:
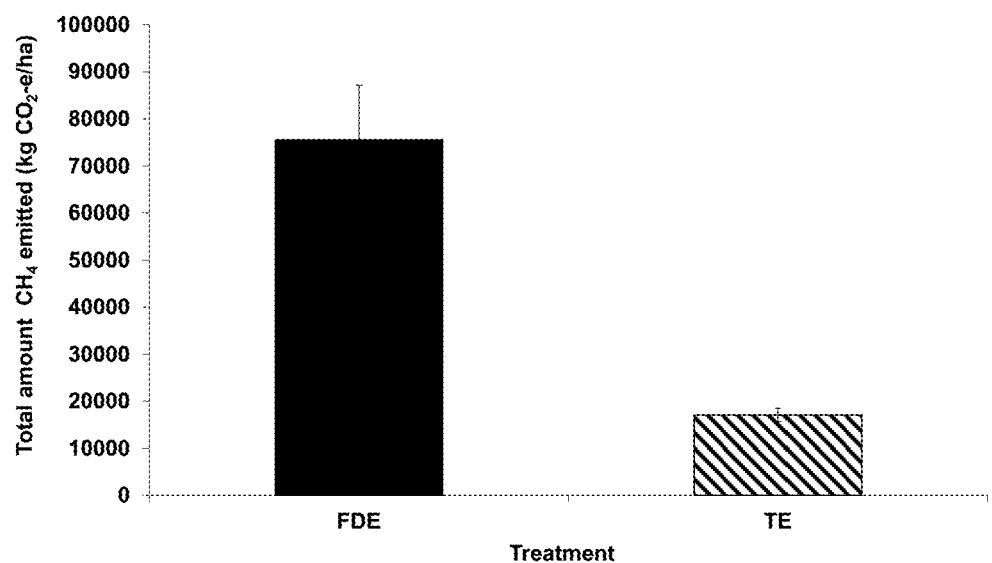

FIG. 8 shows that a single PFS treatment at a rate of 200 mg Fe/L of farm dairy effluent (FDE) on day 1 can reduce the total amount of methane emitted from the treated effluent (TE) over the 36-day period. Error bars are ±standard errors of the mean.

Figure 9:
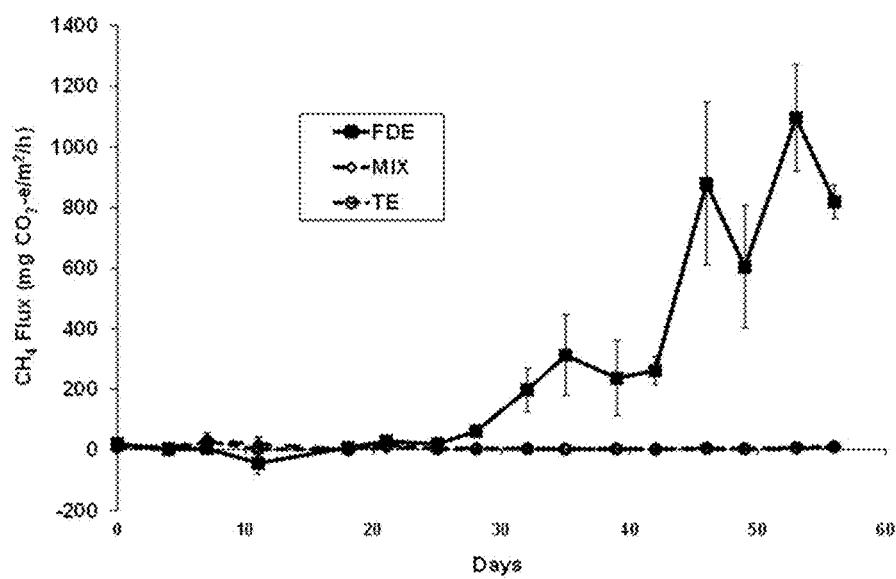

FIG. 9 shows that multiple inputs of PFS at an average rate of 300 mg Fe/L of FDE over a 28 day period reduced the methane emission flux from the treated effluent (TE) and a mix of treated effluent and clarified water (MIX) for a further 28 days after the PFS treatment ceased. Error bars are ±standard errors of the mean.

Figure 10:
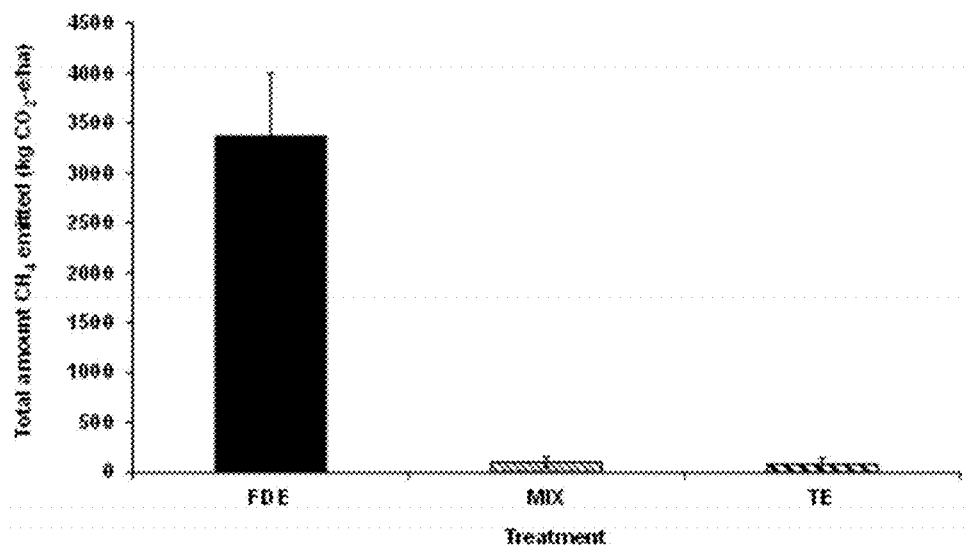

FIG. 10 shows that multiple inputs of PFS at an average rate of 300 mg Fe/L of FDE over a 28 day period reduced the total amount of methane emitted from the treated effluent (TE) and a mix of treated effluent and clarified water (MIX) over a 56 day period. Error bars are ±standard errors of the mean.

Figure 11:
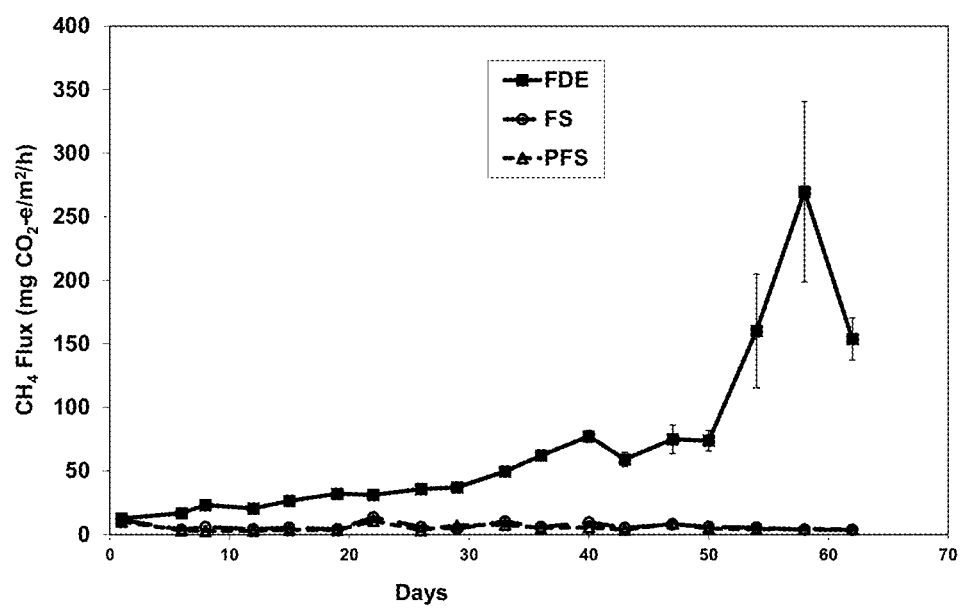

FIG. 11 shows that treatment of FDE with ferric sulphate (FS) (i.e. the trivalent form of iron sulphate; $Fe_2(SO_4)_3$) at a rate of 200 mg Fe/L of FDE is equally as effective in reducing the methane emission flux as treating FDE with polyferric sulphate (PFS) at a rate of 200 mg Fe/L of FDE. Error bars are ±standard errors of the mean.

Figure 12:
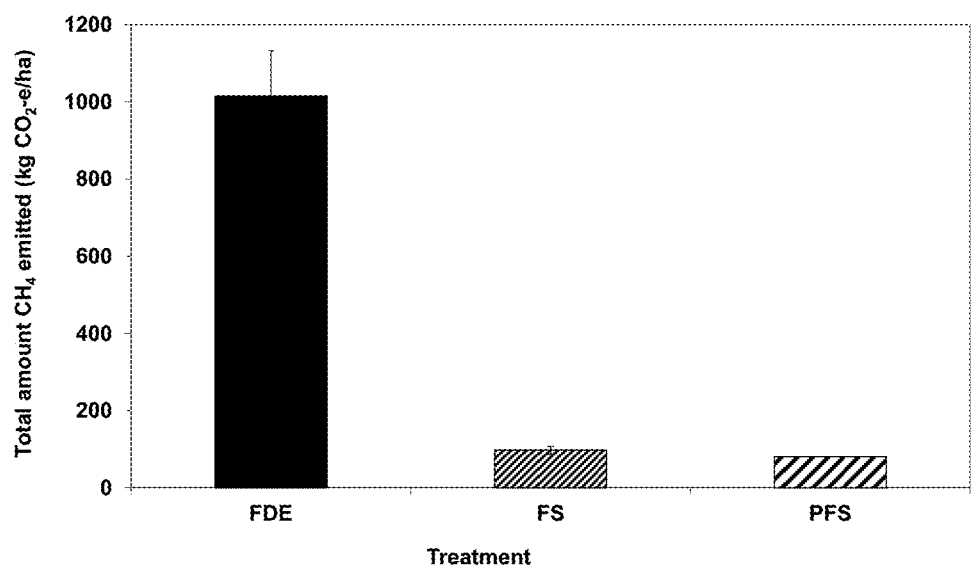

FIG. 12 shows that treatment of FDE with ferric sulphate (FS) (i.e. the trivalent form of iron sulphate; $Fe_2(SO_4)_3$) at a rate of 200 mg Fe/L of FDE is equally as effective in reducing the total amount of methane emitted as treating FDE with polyferric sulphate (PFS) at a rate of 200 mg Fe/L of FDE. Error bars are ±standard errors of the mean.

FIGS. 13a and 13b show that although the amount of methane emitted from FDE can be reduced by treating the FDE with calcium sulphate ($CaSO_4$), potassium sulphate ($K_2SO_4$), aluminium sulphate ($Al_2(SO_4)_3$), magnesium sulphate ($MgSO_4$), and sodium sulphate ($Na_2SO_4$) (FIG. 13a), none of these chemicals are as effective as PFS, and all these alternative sulphate chemicals continued to produce, or enhanced the production of, the toxic gas hydrogen sulphide ($H_2S$), whilst PFS stopped the emission of hydrogen sulphide gas FIG. 13b); and the alternative iron chemical treatments of ferrous sulphate (i.e. the divalent form of iron sulphate; $FeSO_4$), ferric chloride ($FeCl_3$) and ferrous chloride ($FeCl_2$) were not nearly as effective as polyferric sulphate (PFS) in reducing methane emission from treated effluent (FIG. 13a).

Figure 14:
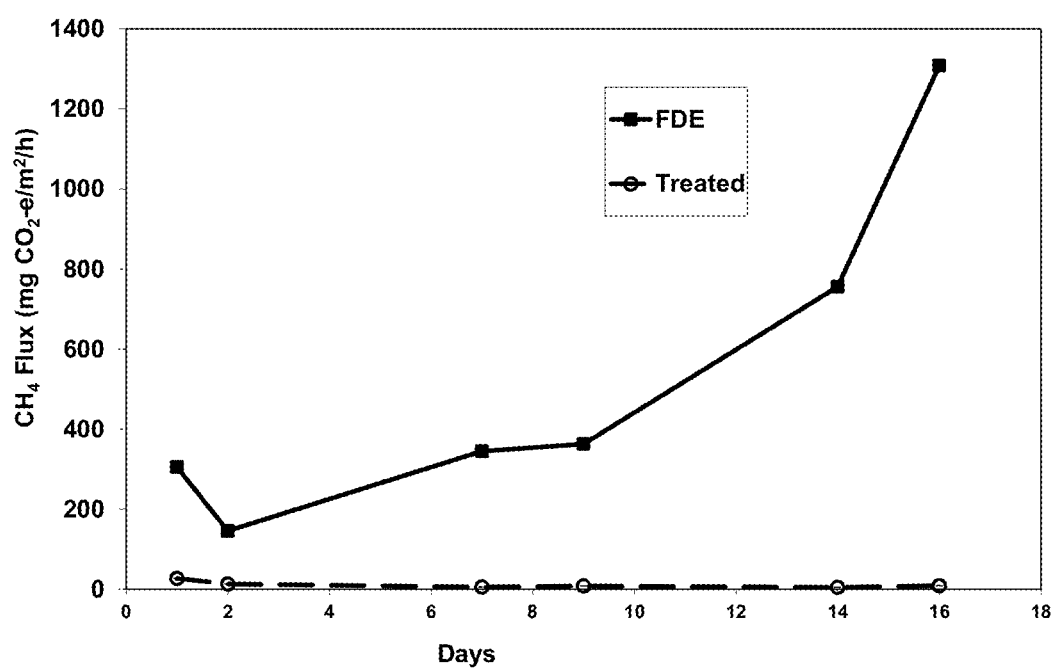

FIG. 14 shows that PFS is highly effective in reducing the methane emission flux from treated effluent (TE) compared to untreated FDE transferred to, and stored in, large 100,000 litre effluent storage tanks on a dairy farm. Average rate of PFS addition was 150 mg Fe/L of FDE.

Figure 15:
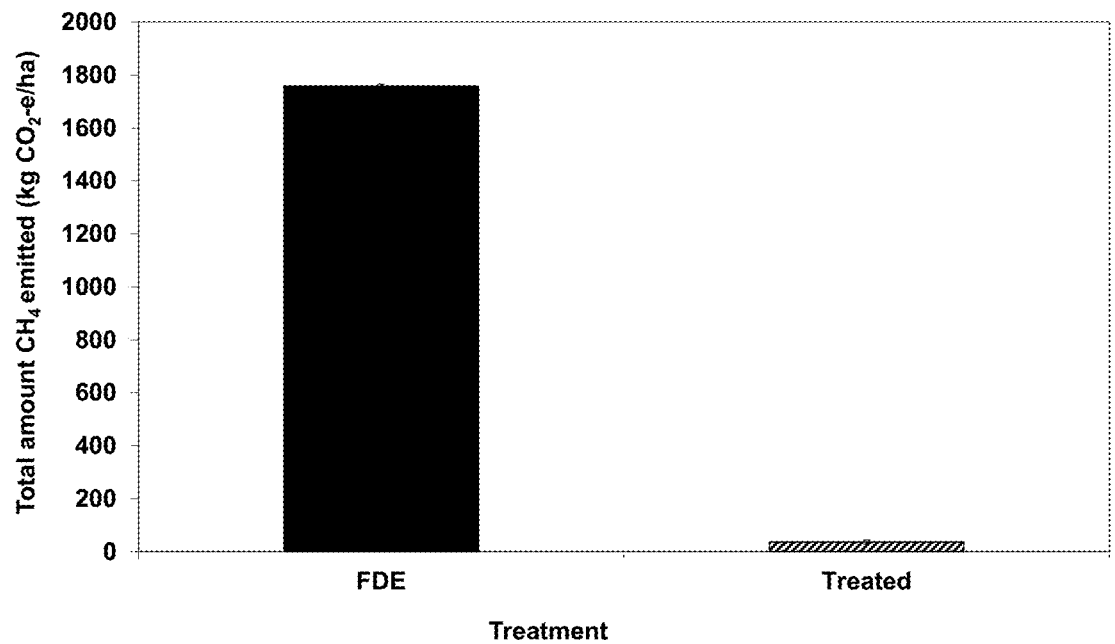

FIG. 15 shows that PFS is highly effective in reducing the total amount of methane emitted from treated effluent (TE) compared to untreated FDE transferred to, and stored in, large 100,000 litre effluent storage tanks on a dairy farm. Average rate of PFS addition was 150 mg Fe/L of FDE. The PFS treatment reduced the total amount of methane emitted by 98%.

Figure 16:
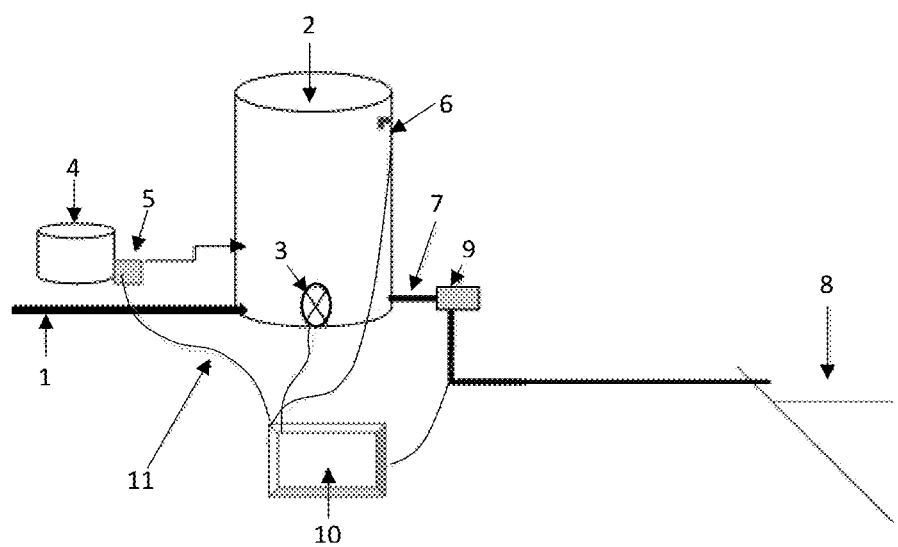

FIG. 16 shows a schematic side view of an effluent methane mitigation treatment system according to a preferred embodiment of a sixth aspect of the present invention where the effluent is pumped into a tank where it can be treated and mixed with FS or PFS before the mixture is transferred into a storage pond(s)/tank(s).

Figure 17:
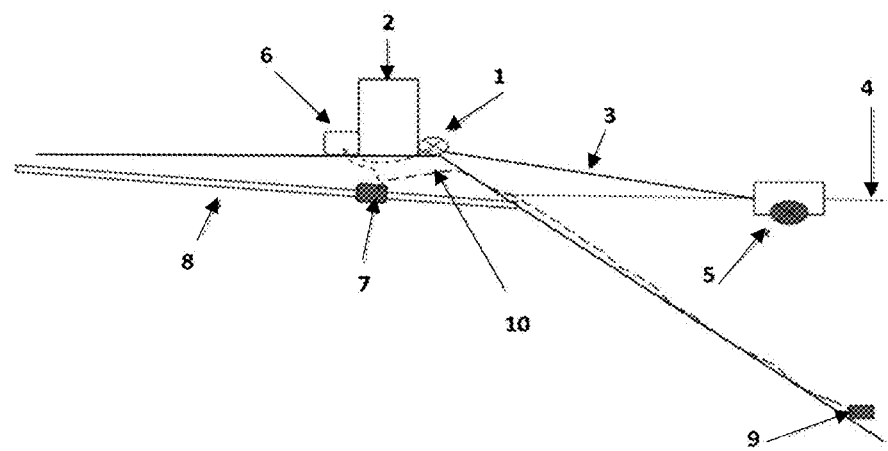

FIG. 17 shows a schematic side view of an effluent methane mitigation treatment system according to a preferred embodiment of a seventh aspect of the present invention where the ferric sulphate or polyferric sulphate is added directly into an effluent storage pond(s)/tank(s).

Figure 18:
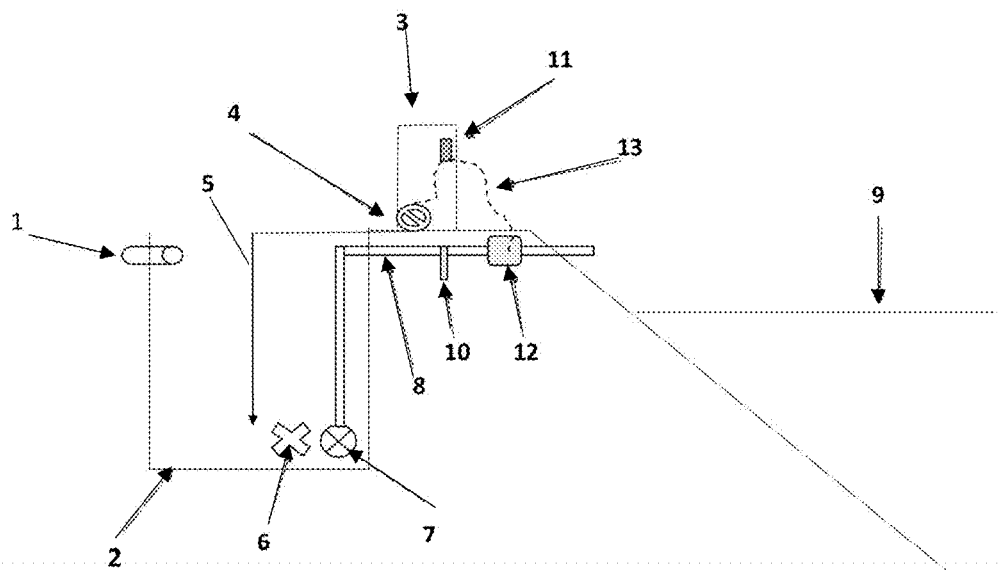

FIG. 18 shows a schematic side view of an effluent methane mitigation treatment system according to a preferred embodiment of a eighth aspect of the present invention where the ferric sulphate or polyferric sulphate is added into a sump tank where it is mixed with the effluent prior to delivery of the treated effluent into an effluent storage pond(s)/tank(s). The treatment system shown in this figure is considered likely to be the most effective and efficient system because of the effectiveness of the mixing system and the minimal amount of infrastructure required.

DETAILED DESCRIPTION

Experiment 1

A simulated animal effluent pond column study was conducted to determine the effect of adding a coagulant solution (polyferric sulphate) to treat farm dairy effluent collected from a farm. The study consisted of PVC pipes (1000 mm high×150 mm in diameter) with endcaps at the base and detachable gas collection caps at the top of each column. These columns represented the physical dimensions of a column of effluent found in a typical farm dairy effluent pond. There were two treatments (untreated farm dairy effluent (FDE) vs. treated effluent (TE)) and seven replicate columns for each treatment. Farm dairy effluent was collected from the Lincoln University Dairy Farm and treated with a polyferric sulphate solution at a rate of 200 mg Fe/L of farm dairy effluent.

Five hundred milliliters of untreated effluent (FDE), or treated effluent (TE), respectively were added to the replicate treatment columns every workday for one month (i.e. excluding weekends). Each addition raised the height of the liquid in the column by 25 mm and after one month the height of effluent in each column was 500 mm. After one month, no more additions were made to the effluent columns, however, measurements continued for another 4 weeks.

Gas sampling was conducted once a day (during the working week) using a standard procedure for gas sampling (Di et al., 2007). The gas caps were attached to each column and three gas samples were taken with 30-minute intervals between each sampling (i.e. at time=0 mins, time=30 mins and time=60 mins). The gas lids were then removed until the next gas sampling occasion.

The concentration of $CH_4$ gas in each sample was determined using a gas chromatograph (GC) (Model 8610C, SRI Instruments, CA, USA) with an automated Gilson GX-271 auto sampler (Gilson Inc., MI, USA) coupled to a flame ionized detector (FID). The GC used three HayeSep D packed pre-columns, and two HayeSep D analytical columns. The carrier gases were $H_2$ and air and the detector temperature setting was 370° C. Hourly GHG emissions were calculated based on the rate of increase in GHG concentration in the chamber corrected for temperature and the ratio of surface area to headspace volume (Richards et al. 2014). The rate of gas emission was calculated using the slope of headspace gas concentration change from the samples collected on each sampling occasion (Hutchinson & Mosier 1981) and the methane emission flux (i.e. gas emission rate per unit area) was calculated using this data. Cumulative emissions were calculated by integrating the measured daily fluxes for the whole experimental measurement period. The results surprisingly showed that treating FDE with polyferric sulphate solution to produce treated effluent (TE) unexpectedly reduced the methane emission flux from the TE compared to the untreated FDE over the 58-day period of the trial (FIG. 1).

The results showed that treating farm dairy effluent with a polyferric sulphate solution reduced the total amount of methane emitted over a 58-day period by around 90% compared to the untreated farm dairy effluent (FIG. 2). This reduction in methane emission can be achieved without increasing hydrogen sulphide ($H_2S$) emissions (in fact PFS significantly reduced $H_2S$ emissions) (FIG. 3).

Following on from this surprising discovery, the inventors conducted a series of additional experiments to verify the results of Experiment #1 and to test the effectiveness of PFS and ferric sulphate (FS) to reduce methane emissions from FDE at a larger scale and on a dairy farm.

Experiment 2

The objective of Experiment 2 was to determine if there was a relationship between the rate of PFS treatment of FDE and the amount of methane emitted. The experiment was conducted using 1.5 L glass jars which were filled with 1 L of farm dairy effluent collected from the Lincoln University Dairy Farm. Eleven rates of PFS were applied in 25 mg Fe/L increments, ranging from 0 up to 250 mg Fe/L. There were four replicates of each treatment set out in a randomised block design in the laboratory.

Each glass jar had a detachable screw cap with rubber septum that allowed gas samples to be collected from the headspace above the effluent using a standard procedure for gas sampling (Di et al. 2007) (as described above in Experiment 1).

The results show that there is a strong inverse relationship between the amount of methane ($CH_4$) emitted and the rate of polyferric sulphate (PFS) treatment (i.e. the higher the rate of PFS application the lower the amount of $CH_4$ emitted (FIG. 4a).

The relationship of the data shown in FIG. 4b can be used to calculate the rate of PFS (or FS) required to achieve a specific percentage reduction in the total amount of methane emitted. In this experiment, the original turbidity of the effluent was measured to be approximately 2,500 NTU and this information can be used in combination with the data in FIG. 4b to calculate the rate of FS (or FS) required, as shown by way of example in Table 1 below):

TABLE 1

| Desired percentage reduction in the amount of methane emitted (%) | Formulae for determining dosage of FS or PFS that needs to be added to the effluent (mg Fe/L effluent) |
| --- | --- |
| >95% reduction | Dosage = 0.1 × NTU value of effluent |
| 90 to 95% reduction | Dosage = 0.08 × NTU value of effluent |
| 80 to 89% reduction | Dosage = 0.06 × NTU value of effluent |
| 60 to 79% reduction | Dosage = 0.04 × NTU value of effluent |
| 40 to 59% reduction | Dosage = 0.024 × NTU value of effluent |
| 20 to 39% reduction | Dosage = 0.013 × NTU value of effluent |

Experiment 3.

The objective of Experiment 3 was to determine the effect of four different rates of PFS treatment of FDE on methane emissions under simulated effluent pond conditions. The experiment used the same microcosm equipment and gas sampling procedures described above for Experiment 1. Farm dairy effluent was collected from the Lincoln University Dairy Farm each day (excluding weekends). The average amount of PFS added to each batch of effluent was 210±14 mg Fe/L of FDE. There were four treatments: (i) untreated FDE, (ii) effluent treated with PFS at the rate calculated to be required to achieve >90% reduction in the total amount of methane emitted (210 mg Fe/L), (iii) effluent treated at half the initial rate (105 mg Fe/L), and (iv) effluent treated at quarter the initial rate (52 mg Fe/L). There were three replicate columns per treatment set out in a randomised block design. Two litres of each treated effluent batch were added to the replicated columns twice per week for one month. Gas samples were collected twice per week for 28 days. The concentration of $CH_4$ gas was determined using gas chromatography (as described above).

The results of this laboratory microcosm study shows that the methane emission flux from untreated farm dairy effluent (FDE) was reduced when the effluent was treated with polyferric sulphate (TE) at all three rates and that the size of the reduction depended on the rate of PFS applied in the treatment (FIG. 5). The results of the experiment also shows that the total amount of methane emitted from untreated FDE was reduced when the effluent was treated with PFS (TE) at all three rates and that the size of the reduction depended on the rate of PFS applied in the treatment (FIG. 6).

Experiment 4

The objective of Experiment 4 was to 'scale up' the measurements to determine the effect of PFS treatment of FDE on $CH_4$ emissions using larger (3.5 m deep×0.5 m diameter) PVC pipes installed on a farm. These large columns represent vertical 'mesocosms' of effluent that would be present in a typical farm dairy effluent pond; with the advantage that replicated treatments could be compared. Each column had an end cap glued onto the bottom and a water trough collar attached to the top. The gas capture equipment was identical to that used for gas capture in nitrous oxide measurement research (Di et al. 2007) and involved placing an insulated gas capture chamber over the column with the edge of the chamber inserted into the water trough (thus giving an airtight gas seal). Each gas collection chamber had a small fan which circulated the gas within the sealed head space of the column.

There were two treatments: (i) untreated FDE and (ii) FDE treated with PFS (TE). There were seven replicates of each treatment set out in a randomised block design. Five hundred and sixty litres of farm dairy effluent were pumped from the FDE storage pond on Lincoln University Dairy Farm into each column leaving a head space height of c. 10 cm. The turbidity of the FDE was measured to be approximately 2,200 NTU and therefore, based on the formula given in Table 1, the PFS solution was added at a rate of 200 mg Fe/L of FDE. The PFS treatment was mixed into the effluent in the PVC pipe for two minutes using a hand-held electric drill fitted with a paddle stirrer.

The results show that a single PFS treatment of farm dairy effluent (FDE) on day 1 can reduce the methane emission flux from the treated effluent (TE) for 36 days (FIG. 7).

The results also show that a single PFS treatment of farm dairy effluent (FDE) on day 1 can significantly reduce the total amount of methane emitted from the treated effluent (TE) for 36 days (FIG. 8).

Experiment 5

The objective of experiment 5 was to determine the effect of adding PFS on $CH_4$ emissions during, and after, sequential additions of effluent into the mesocosm columns (i.e. simulating standard practice on a farm where effluent is treated each day and pumped into the effluent storage pond). There were three treatments: (i) untreated FDE, (ii) treated effluent (TE) and, (iii) a mixture of treated effluent and clarified water (MIX) that was collected immediately after the PFS was mixed into the effluent but before settling of the TE had occurred. There were four replicates of each treatment set out in a randomised block design.

Fifty-six litres of each effluent treatment were transferred into each replicated treatment column twice per week for five weeks, until the columns were nearly full (560 L). Untreated FDE was pumped into the mesocosm columns from the effluent sump at the dairy shed on the farm. The PFS solution was added automatically by a computer-controlled pump (the average rate used for the ten batches was 300±14 mg Fe/L). After mixing for 15 minutes, 56 L of the mixture (MIX) was then pumped into each treatment replicate column. The mixing tank was then allowed to settle for three hours to enable the flocculated particles in the treated effluent to settle to the bottom of the tank; 56 L of TE was then pumped from the bottom of the tank into each replicated treatment column.

Gas sampling was conducted twice per week using the standard procedure for gas sampling described earlier. Once the gas caps were attached to each column, three gas samples were taken with 30-minute intervals between each sampling (i.e. at time=0 minutes, time=30 minutes, and time=60 minutes). The gas caps were then removed until the next gas sampling occasion. The concentration of $CH_4$ gas was determined using gas chromatography (as described earlier).

The results of Experiment 5 show that multiple inputs of PFS over a 28 day period reduced the methane emission flux from the treated effluent (TE) and a mix of treated effluent and clarified water (MIX) for a further 28 day without any further input of PFS being required (FIG. 9).

The results of field mesocosm Experiment 5 also show that multiple inputs of PFS over a 28 day period significantly reduced the total amount of methane emitted from the treated effluent (TE) and a mix of treated effluent and clarified water (MIX) by >90% over a 56 day period (FIG. 10).

Experiment 6

The objective of Experiment 6 was to compare the effectiveness of ferric sulphate (FS) versus polyferric sulphate (PFS) to reduce methane emissions from treated effluent. Experiment 6 was conducted using the same large (3.5 m deep×0.5 m diameter) PVC pipes described in Experiment 5. The gas capture equipment and measurement process were also identical to that described in Experiment 5.

There were three treatments: (i) untreated FDE; (ii) TE produced using PFS and (iii) TE produced using FS. There were four replicates of each treatment set out in a randomised block design. Five hundred and sixty litres of farm dairy effluent were pumped from the FDE storage pond on Lincoln University Dairy Farm into each column leaving a head space height of 10 cm. The same rate of PFS and FS was used (200 mg Fe/L of FDE). The PFS and FS solution was mixed into the effluent for two minutes using a handheld electric drill fitted with a paddle stirrer.

Results of Experiment 6 show that treatment of FDE with ferric sulphate (FS) (i.e. the trivalent form of iron sulphate: $Fe_2(SO_4)_3$) is equally as effective in reducing the methane emission flux as treating FDE with polyferric sulphate (PFS) (FIG. 11).

Results of Experiment 6 show that treatment of FDE with ferric sulphate (FS) (i.e. the trivalent form of iron sulphate; $Fe_2(SO_4)_3$) is equally as effective in reducing the total amount of methane emitted as treating FDE with polyferric sulphate (PFS) (FIG. 12).

Experiment 7

The objective of Experiment 7 was to measure the effect of different sulphate and/or iron compounds on emissions of methane and hydrogen sulphide gases from treated effluent. The experiment was conducted using the same 1.5 L glass jars and methods of measurement described in Experiment 2 above. There were 10 treatments: (i) untreated FDE, (ii) PFS treated effluent, (iii) calcium sulphate ($CaSO_4$) treated effluent, (iv) potassium sulphate ($K_2SO_4$) treated effluent, (v) aluminium sulphate ($Al_2(SO_4)_3$) treated effluent, (vi) magnesium sulphate ($MgSO_4$) treated effluent, (vii) sodium sulphate ($Na_2SO_4$) treated effluent, (viii), ferrous sulphate (i.e. the divalent form of iron sulphate) ($FeSO_4$) treated effluent, (ix) ferric chloride ($FeCl_3$) treated effluent, and (x) ferrous chloride ($FeCl_2$) treated effluent. The sulphate treatment chemicals were all used at the same rate of sulphate as applied in the PFS treatment (326 mg $SO_4$/L) and the iron treatment chemicals were all used at the same rate of iron as applied in the PFS treatment (133 mg Fe/L).

Figure 13:
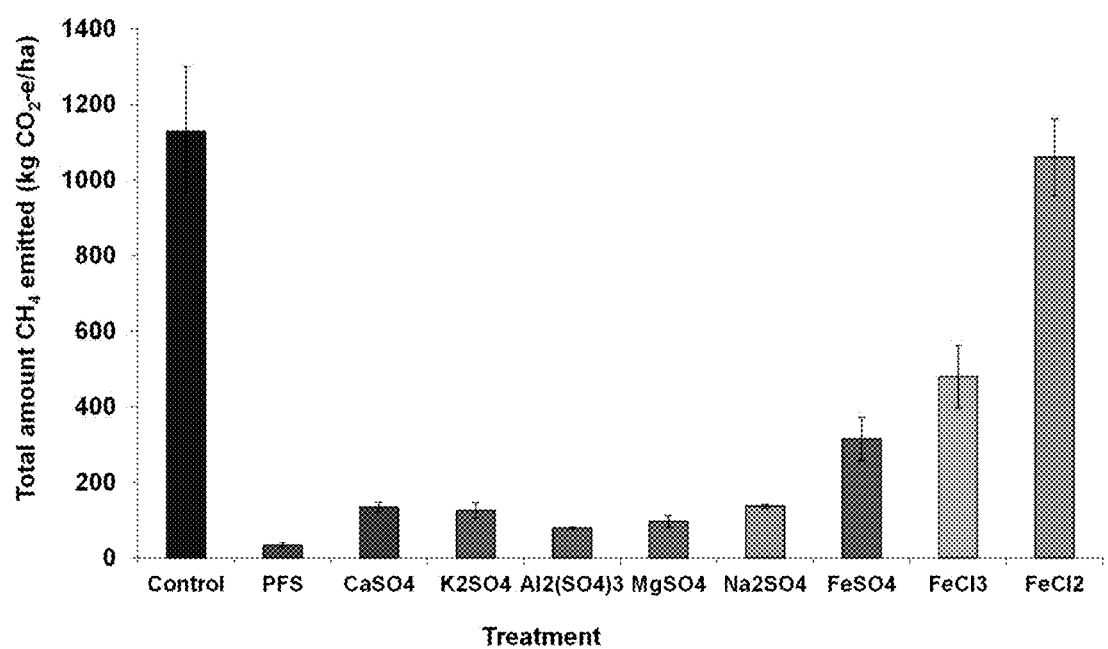
Figure 13:
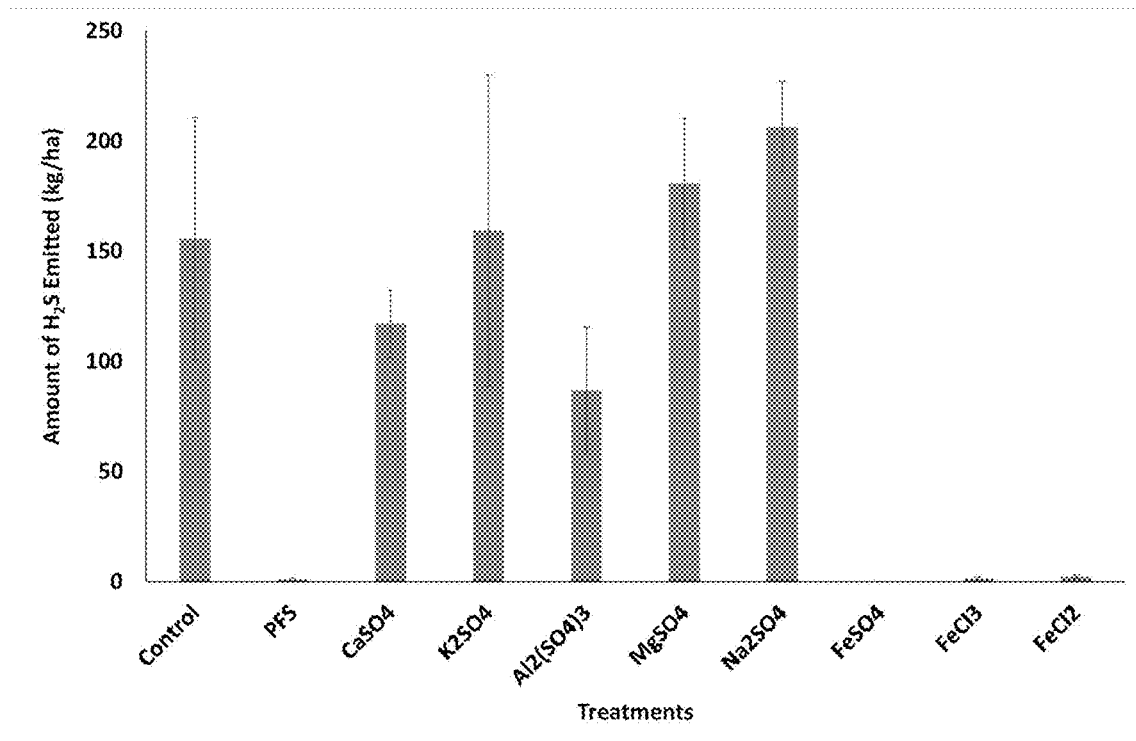

The results show that although the amount of methane emitted from FDE can be reduced by treating the FDE with calcium sulphate ($CaSO_4$), potassium sulphate ($K_2SO_4$), aluminium sulphate ($Al_2(SO_4)_3$), magnesium sulphate ($MgSO_4$), sodium sulphate ($Na_2SO_4$), (FIG. 13 a) none of these chemicals were as effective as PFS and all these sulphate treatment chemicals continued to produce, or enhanced the production of, the toxic gas hydrogen sulphide ($H_2S$), whilst PFS reduced the emission of hydrogen sulphide (FIG. 13 b).

The results also show that the alternative iron treatments; ferrous sulphate (i.e. the divalent form of iron sulphate: $FeSO_4$), ferric chloride ($FeCl_3$) and ferrous chloride ($FeCl_2$) were not nearly as effective as polyferric sulphate (PFS) in reducing methane emission from treated effluent (FIG. 13 a).

Experiment 8

The objective of Experiment 8 was to increase the scale of measurements to represent farm scale conditions. This was achieved by measuring the effect of PFS treatment of FDE on $CH_4$ emissions from effluent stored in typical effluent storage tanks used on a dairy farm. Two commercially available 100,000 L effluent storage tanks were constructed on the Lincoln University Research Dairy Farm. One tank was used to store untreated FDE and the other tank used to store treated effluent (TE). A gas tight roof (with vents) was installed over the top of each tank which allowed the gas emissions to be captured and sampled when the vents were closed. During the time period between sampling events, the vents were left open to ensure that typical effluent tank storage conditions occurred.

These 100,000 litre storage tanks were filled by transferring five batches of approximately 20,000 L of untreated FDE directly from the existing farm effluent sump into the 'untreated FDE tank' and by transferring five batches of approximately 20,000 L of treated effluent into the TE tank. The tanks were filled in sequential batches to ensure that, as far as possible, the effluent composition was similar between the untreated batch and the treated batch produced each day on the farm. The average turbidity of the effluent was 1,400 NTU and the average rate of PFS treatment for each 20,000 L batch was therefore calculated (according to Table 1) to be 150 mg Fe/L of FDE.

Gas sampling was conducted twice per week by closing the vents on the top of each tank allowing the gas emissions to be captured and sampled. Once the vents were closed, three gas samples were taken with 90-minute intervals between each sampling (i.e. at time=0 minutes, time=90 minutes, and time=180 minutes). The vents were then left open until the next gas sampling occasion. The concentration of $CH_4$ gas was determined using gas chromatography (as described earlier).

The results of Experiment 8 show that PFS is highly effective in reducing the methane emission flux from treated effluent (TE) compared to untreated FDE transferred to, and stored in, large 100,000 litre effluent storage tanks on a dairy farm (FIG. 14).

The results of Experiment 8 also show that PFS is highly effective in reducing the total amount of methane emitted from treated effluent (TE) compared to untreated FDE transferred to, and stored in, large 100,000 litre effluent storage tanks on a dairy farm (FIG. 15). The PFS treatment reduced the total amount of methane emitted from the effluent by around 98% (FIG. 15).

Methane Treatment Delivery Systems

In FIG. 16 there is shown an animal effluent methane mitigation treatment system where the effluent is pumped from an effluent catchment area through a pipe 1 into an existing or new sump tank 2 which has a mixer 3 for mixing the treatment chemical (FS or PFS) into the effluent. The FS or PFS is stored in a chemical storage tank 4 and the treatment solution is delivered into the mixing tank by a pump 5. There is a turbidity sensor 6 in the mixing tank to measure the turbidity of the effluent and a pipe 7 that directs all of the treated effluent from the mixing tank into an effluent storage pond(s)/tank(s) 8 via an optional pump 9 or through gravity. The treatment system is controlled by a PLC 10 that has data/control cables 11 to the electronic component parts of the treatment system. The amount of PFS or FS that is required to achieve a specific reduction in the amount of methane emitted is computed by the PLC based on the data presented in FIG. 4b and in Table 1 (shown above).

In FIG. 17 there is shown an animal effluent methane mitigation treatment system where the treatment chemical (FS or PFS) is delivered by a pump 1 from a chemical storage tank 2 through a pipe 3 directly into an effluent storage pond/tank 4, with a or without a stirrer 5, and the amount of FS or PFS delivered is controlled by a PLC 6 connected to a flow meter 7 in the effluent pond delivery pipe 8, or another sensor 9 in the pond, that detects the volume of the latest batch of fresh effluent added into the pond and sends data to the PLC by data cable 10 to control the delivery of FS or PFS to treat the measured volume of fresh effluent added into the pond/tank. The amount of PFS or FS that is required to achieve a specific reduction in the amount of methane emitted is computed by the PLC based on the data presented in FIG. 4b and in Table 1 (shown above).

In FIG. 18 there is shown an animal effluent methane mitigation treatment system where the effluent is transferred via a pipe 1 from an effluent catchment area (e.g. yard) into a sump tank 2 where the treatment chemical (FS or PFS) is added from a chemical storage tank 3 via a pump 4 and delivery pipe 5. The chemical is mixed into the effluent using a mixer 6 in the sump tank and the treated effluent is transferred by a pump 7 from the sump tank through a pipe 8 to an effluent storage pond(s)/tank(s) 9. There is a turbidity sensor 10 in the pipe to measure the turbidity of the effluent and this data can be used by the PLC 11 to control the amount of treatment chemical added to the effluent. The amount of PFS or FS that is required to achieve a specific reduction in the amount of methane emitted is computed by the PLC based on the data presented in FIG. 4b and in Table 1 (shown above).

There is a flow meter 12 in the pipe to measure the amount of effluent pumped to the pond and this data is sent by data cable 13 to the PLC to control the amount of FS or PFS added to the effluent sump tank. The ferric sulphate or polyferric sulphate is added into the sump tank when a prescribed amount of effluent (e.g. 5,000 L) has been pumped out of the sump tank into the storage pond(s)/tank(s), so that the ferric sulphate or polyferric sulphate can react with an equivalent amount of fresh effluent that drains into, or is pumped into, the sump tank.

Discussion of the Invention Including Alternate Ways to Implement the Invention

The present invention has application to cattle, in particular, but not limited to, dairy cows.

However, it should be appreciated, that the present invention can also be used in relation to other agricultural animals, which are grouped in areas where liquid effluent is going to be collected and needs to be stored or disposed.

The present invention concerns the surprising discovery that adding ferric sulphate or polyferric sulphate into liquid animal effluent—which is contrary to the art of human municipal wastewater treatment which wants to reduce the ionic sulphur content in effluent to prevent hydrogen sulphide production (HulshoffPol et al., 1998, Metcalf and Eddy, 2014), can significantly reduce methane emissions.

It is important, however, to note that the (human) wastewater treatment engineering literature actually teaches that sulphate can cause the 'failure' of the anaerobic process of organic matter digestion used in many wastewater treatment facilities (HulshoffPol et al., 1998, Metcalf and Eddy, 2014)). Therefore, it was not expected that adding ferric sulphate or polyferric sulphate could be used to reduce methane emissions from animal effluent—whilst not compromising the effective treatment of effluent.

The main reason that the wastewater treatment plant engineers would not want large amounts of sulphate in the anaerobic treatment plant is that it inhibits the full anaerobic breakdown of organic matter in the sewage water.

This is important because the predominant method of disposal of treated wastewater effluent is to discharge it into surface water (rivers, lakes or the ocean) (e.g. Christchurch City Council, 2019; Brittania, 2019). When treated sewage wastewater eventually goes into rivers, lakes or the ocean, any organic matter remaining in the wastewater will deplete the river, lake or ocean of oxygen (due to the Biochemical Oxygen Demand (BOD) of the organic material) causing death of fish and other aquatic life (MFE, 2019b). The BOD of the treated effluent must be kept low to avoid adverse impacts on the receiving water (MFE 2019b) thus the anaerobic process must not be inhibited by the presence of sulphate.

Thus, wastewater treatment plants do not want to add sulphates including ferric sulphate or polyferric sulphate to the sewage water.

HulshoffPol et al. (1998) specifically states that the presence of sulphate "can cause severe problems when sulphate containing organic wastewater is treated anaerobically". This is of the utmost importance, because free hydrogen sulphide ($H_2S$) concentrations can cause wastewater treatment process failure due to sulphide toxicity.

According to HulshoffPol et al. (1998) gaseous and dissolved sulphides cause physical-chemical (corrosion, odour, increased effluent chemical oxygen demand) or biological (toxicity) constraints, which may lead to process failure.

Therefore, attempts have been made to remove, or suppress, the effects of sulphate in wastewater treatment plants. For example, the strategies currently available to do this include: i) removal of the organic matter, ii) removal of sulphate or iii) removal of both—(HulshofPol et al. 1998).

Zub et al. (2008) also provide a list of strategies to remove sulphur containing compounds from wastewater prior to treatment in order to ensure that the biological process of wastewater treatment is not adversely affected.

The results of our experiments show that adding polyferric sulphate or ferric sulphate can reduce methane emissions from animal effluent without increasing hydrogen sulphide emissions (FIGS. 3 and 13b). In fact, the experimental data show that the hydrogen sulphide emissions are significantly reduced when animal effluent is treated with polyferric sulphate. This demonstrates the utility of the invention because polyferric sulphate or ferric sulphate can be used to reduce methane emissions from the animal effluent without the risk of increasing hydrogen sulphide emissions.

Treating animal effluent with polyferric sulphate on a farm is different to treating sewage wastewater because the treated animal effluent is generally applied onto the land; where there is much less risk of impact in terms of Biochemical Oxygen Demand (BOD) compared with human effluent which is discharged into surface water as discussed earlier.

So, the present invention provides a previously unforeseen opportunity to inhibit the anaerobic breakdown process in animal effluent before methane gets produced whilst the sewage wastewater engineers cannot interfere with the anaerobic process by adding ferric sulphate or polyferric sulphate.

The present invention also provides an opportunity to return more carbon to the soil if we inhibit the anaerobic process before it produces methane (i.e. rather than allow the carbon to be lost to the atmosphere as methane causing greenhouse gas emissions). As the treated effluent/sludge has organic matter therein containing a large amount of readily available carbon (in the form of simple organic compounds such as acetic acid) which can be applied to the land. Why lose the carbon into the atmosphere if we can recycle it back into the soil?

The PFS or FS may be added to the FDE as in a powder or liquid form.

The amount of ferric sulphate or polyferric sulphate that is added to the liquid animal effluent will depend on:
 the type of animal effluent; and
 the solids content (especially the organic matter content) of the effluent (turbidity being used as a measurement/indicator thereof).

The polyferric sulphate or ferric sulphate may be added to the liquid animal effluent either whilst in transit to, or once delivered to:
 a pond,
 lagoon,
 tank,
 storage or transportation vessel.

The source of liquid animal effluent may generally be a cattle yard, or a milking shed/parlor for dairy cows.

However, the source of liquid animal effluent should not be limited and may include one or more of the following:
 stock lanes (or stock races);
 stock feed pads
 stock housing facilities;
 cattle trucks;
 sheep trucks;
 effluent disposal tanks (e.g. sheep/cattle trucks); and
 animal holding pens or yards.

The invention may also be said broadly to consist in the parts, elements, characteristics and features referred to or indicated in the specification of the application, individually or collectively, in any or all combinations of two or more of said parts, elements, characteristics or features.

Aspects of the present invention have been described by way of example only and it should be appreciated that modifications and additions may be made thereto without departing from the scope thereof as defined in the appended claims.

REFERENCES

Brittania (2019). Wastewater treatment for pollution control. https://www.britannica.com/explore/savingearth/wastewater-treatment/

Christchurch City Council (2019). Christchurch City Council Waste Water Treatment Plant Discharge Consent. https://www.ccc.govt.nz/services/water-and-drainage/wastewater/treatment-plants/christchurch-wastewater-treatment-plant/discharge-consent-monitoring.

Di, H. J., Cameron, K. C., Sherlock, R. R. (2007). Comparison of the effectiveness of a nitrification inhibitor, dicyandiamide, in reducing nitrous oxide emissions in four different soils under different climatic and management conditions. *Soil Use and Management,* 23: 1-9.

Gluckman, P. (2018). Mitigating agricultural greenhouse gas emissions: Strategies for meeting New Zealand's goals. https://www.pmcsa.org.nz/wp-content/uploads/Mitigating-agricultural-GHG-emissions-Strategies-for-meeting-NZs-goals.pdf HulshoffPol, L. W., Lens, P., Stams, A., Lettinga, G. (1998). Anaerobic treatment of sulphate-rich wastewaters. *Biodegradation,* 9: 213-224.

Hutchinson G L, Mosier A R. (1981). Improved soil cover method for field measurement of nitrous oxide fluxes. Soil Use and Management. 2:311-315.

Laubach, J., Heubeck, S., Pratt, C., Woodward, K. B., Guieysse, B., van der weerden, T. J., Chung, M. L., Shilton, A. N., Craggs, R. J. (2015). Review of greenhouse gas emissions for the storage and land application of farm dairy effluent. *New Zealand Journal of Agricultural Research,* 58 (2): 203-233.

Metcalf and Eddy. (2014). Wastewater Engineering. McGraw-Hill, New York.

MFE (2019a). New Zealand's Greenhouse Gas Inventory 1990-2017. Ministry for the Environment, Wellington, New Zealand. https://www.mfe.govt.nz/climate-change/state-of-our-atmosphere-and-climate/new-zealands-greenhouse-gas-inventory MFE (2019b). Sustainable wastewater management. https://www.mfe.govt.nz/publications/waste/sustainable-wastewater-management-handbook-smaller-communities-part-1-0

MPI (2012). Revised methane emission factors and parameters for dairy effluent ponds. Final Report Contract: 12215 (IR-H 13). Prepared by Pratt, C., Walcroft, A. (Landcare Research); Shilton, A., Guieysse, B., Chung, M. (Massey University); Craggs, R., Heubeck, S. (National Institute of Atmospheric Research). https://www.mpi.govt.nz/dmsdocument/14506/direct MPI (2014). Review of gaseous emissions of methane, nitrous oxide and ammonia, and nitrate leaching to water, from farm dairy effluent storage and application to land. MPI Technical Paper No: 2018/39. https://www.agriculture.govt.nz/dmsdocument/30131/direct MPI (2017). Trends in Dairy Effluent Management Final report. Ministry for Primary Industries Technical Paper Number 2018/70. Prepared by Rollo, M., Ledgard, S., Longhurst, B., AgResearch. http://www.mpi.govt.nz/news-and-resources/publications CZub, S., Kurrisso, Y., Menert, A. Blonskaja, V. (2008). Combined biological treatment of high-sulphate wastewater from yeast production. *Water and Environment Journal* 22, 274-286.

What we claim is:

1. A method to reduce methane emissions from liquid animal effluent relative to untreated liquid animal effluent using ferric sulphate or polyferric sulphate comprising:
    adding a dose of ferric sulphate or polyferric sulphate, expressed in mg Fe/L effluent, calculated from the measurement of the turbidity, expressed in NTU, of the effluent to be treated to achieve a desired percentage reduction in the amount of methane emitted; and
    measuring the percentage reduction in the amount of methane emitted from the liquid animal effluent after adding the dose of ferric sulphate or polyferric sulphate, wherein the dose required for a desired percentage reduction is determined by the formulae detailed in the following table:

| Desired percentage reduction in the amount of methane emitted (%) | Formulae for determining dosage of FS or PFS that needs to be added to the effluent (mg Fe/L effluent) |
| --- | --- |
| >95% reduction | Dosage = 0.1 × NTU value of effluent |
| 90 to 95% reduction | Dosage = 0.08 × NTU value of effluent |
| 80 to 89% reduction | Dosage = 0.06 × NTU value of effluent |
| 60 to 79% reduction | Dosage = 0.04 × NTU value of effluent |
| 40 to 59% reduction | Dosage = 0.024 × NTU value of effluent |
| 20 to 39% reduction | Dosage = 0.013 × NTU value of effluent. |

* * * * *